July 5, 1949. D. SCIAKY 2,474,866
THREE-PHASE WELDING DEVICE
Filed Oct. 22, 1945 4 Sheets-Sheet 4

INVENTOR.
David Sciaky,
BY
Wilkinson Huxley Byron & Knight
attys.

Patented July 5, 1949

2,474,866

UNITED STATES PATENT OFFICE 2,474,866

THREE-PHASE WELDING DEVICE

David Sciaky, Chicago, Ill., assignor to Welding Research, Inc., Chicago, Ill., a corporation of Illinois Application October 22, 1945, Serial No. 623,657

11 Claims. (Cl. 171—97)

1

The invention relates to the art of electric welding and has reference in particular to a method and apparatus for converting single or polyphase current of a given frequency into a single phase current of lower frequency.

The present apparatus has been especially designed for the resistance welding of metals and in operation the apparatus welds with a low frequency alternating current although drawing a balanced load from a multiple phase alternating current supply line of much higher frequency.

Conventional alternating current resistance welders can be operated only on a single phase current. For two or three phase power installations, which are generally used in industrial plants, this leads to an unbalanced power load and proves a major inconvenience in the case of large machines because of the high power demand. The difficulty lies in the nature of the welding transformer which can not transform a multiple phase supply into a single phase current. An additional disturbance is caused by the high reactance of the secondary circuit of the welder which results in a very low power factor, usually less than thirty per cent.

In my Patent No. 2,415,708, granted February 11, 1947, and entitled Welding method and apparatus therefor, I disclose and claim a welding system for converting single or polyphase currents of conventional frequency into a single phase current of relatively low frequency. A low frequency alternating current for welding purposes is produced by applying successive impulses of uni-directional current to the primary winding of the welding transformer and in reversing the direction of current flow through the primary winding on each impulse. Since a low frequency current is used as the actual welding current the power factor of the secondary circuit is materially improved and the power and heat losses are reduced. Also by reversing the uni-directional current impulses an additional advantage is secured, namely, a longer application of the voltage for each impulse is possible without saturating the iron core of the transformer.

An object of the present invention is to provide improved welding apparatus which will utilize a low frequency alternating current for welding and wherein a balanced load may be drawn from a multiple phase alternating current supply.

Another object of the invention resides in the provision of means for reversing the direction of the uni-directional current impulses through operation of the rectifier and accordingly the

2 rectifier is constructed with two valves for each phase. Said valves, as regards each phase, are connected in anti-parallel relation and thus in operation one set of valves is rendered conductive for a predetermined period of time for passing an impulse of current in one direction and thereafter the other set is rendered conductive also for a predetermined period for passing the succeeding impulse in an opposite direction.

Another object of the invention is to provide a control circuit for electrically controlling the valves in the rectifier to reverse the direction of current flow through the primary of the welding transformer on each impulse to induce a low frequency current in the secondary load circuit, and wherein said control circuit operates in accordance with the rise and fall of the current in the secondary load circuit of the transformer.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1:
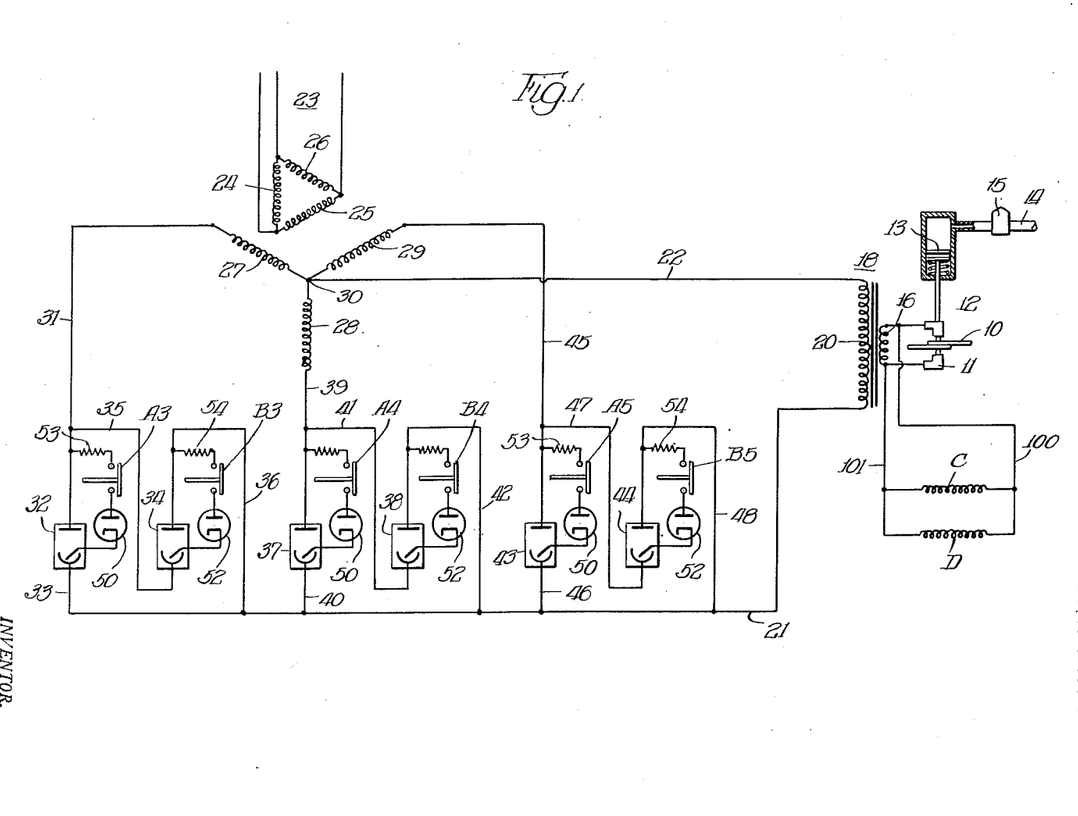
Figure 1 is a diagrammatic view illustrating apparatus for welding having a mode of operation and embodying structure coming within the invention.

Referring to the form of the invention shown in Figure 1, the workpieces 10 to be welded are placed between the stationary electrode 11 and the movable electrode 12 of the welding machine. Pneumatic pressure is applied to piston 13 from the air line 14 through operation of valve 15, thereby causing the workpieces to be placed under mechanical pressure between electrodes 11 and 12 which are electrically connected to the secondary winding 16. Said winding and the connections to the electrodes constitute the secondary circuit of the welding transformer identified in its entirety by numeral 18. The primary winding 20 is electrically connected by means of the conductors 21 and 22 to the secondary windings of a three-phase transformer, there being interposed between the respective phases and conductor 21 a plurality of electric discharge valves which function to rectify the alternating current and to control the direction of current flow through said primary winding 20 of the welding transformer. The structure and operation of this transformer-type rectifier will now be described.

The source of current for the rectifier is identified by numeral 23, the same comprising the conventional three-phase alternating current supply having connection respectively with the primary windings, namely, 24, 25 and 26, of the power transformer. Each primary winding has a corresponding secondary winding, identified by numerals 27, 28 and 29. The conductor 22 is electrically connected at 30 to the neutral point of the secondary windings and accordingly said conductor has connection with one terminal of each of the windings 27, 28 and 29. The other terminal of each secondary winding is electrically connected to conductor 21 through sets of electric discharge valves connected in anti-parallel relation.

With respect to winding 27 the conductor 31 is electrically connected to the anode of the ignitron 32, the cathode of which connects through conductor 33 with the conductor 21 leading to the primary winding 20. The ignitron 34, similar to 33, is connected in anti-parallel relation therewith since the conductor 35 joins conductor 31 to the cathode of said ignitron 34, with the anode of the same being electrically connected by conductor 36 to the conductor 21. The secondary winding 28 is similarly connected to conductor 21 through ignitrons 37 and 38. The conductor 39 joins the outer terminal of the winding 28 to the anode of said ignitron tube 37 with the cathode being joined by conductor 40 to conductor 21. Conductor 41 connects said conductor 39 to the cathode of ignitron tube 38 with the anode of said tube being connected by conductor 42 to said conductor 21. As regards secondary winding 29, a similar connection for the ignitron tubes 43 and 44 is provided. The conductor 45 joins said winding 29 with the anode of ignitron 43 with the cathode of said tube being electrically connected by conductor 46 to conductor 21. The conductor 47 electrically connects conductor 45 with the cathode of tube 44, the anode of which tube is connected by conductor 48 with 21.

With a rectifier such as described above it is possible to modify the wave shape of the secondary current since the voltage of the direct current impulses through primary winding 20 can be varied. It will be understood that each ignitron tube includes an anode, a mercury cathode, and a firing pin. The circuit from the anode to the cathode through the tube is non-conducting until the mercury is vaporized, this being accomplished by the firing pin which extends into the tube, having contact with the mercury cathode. For closing the circuit through the firing pin on the ignitron tube a by-pass circuit for each tube is provided including phanotrons 50 for the tubes 32, 37 and 43 and phanotrons 52 for the tubes 34, 38 and 44. The firing of the ignitrons through their respective firing pins is thus controlled by the phanotrons. In the non-firing condition phanotrons 50 are held non-conductive by the contactors A3, A4 and A5 located in the by-pass circuits in series relation with their phanotrons and the firing pin of their respective ignitron tube The phanotrons 52 are similarly held non-conductive by contactors B3, B4 and B5, located in the by-pass circuits in series relation with their phanotrons and the firing pin of their respective ignitron tube. Fuses, not shown, may be located in each by-pass circuit as protection against overload for the phanotrons 50 and 52, respectively, and resistors 53 and 54 are likewise provided to limit the current through the phanotrons.

Firing of the ignitrons 32, 37 and 43 is accomplished by closing contactors A3, A4 and A5. This completes the circuit from the mercury pool cathodes through the firing pins of the ignitrons, through the phanotrons 50, the contactors A3, A4 and A5, and the resistors 53 to the anodes of the ignitrons. As soon as a positive half cycle of alternating-current sine wave voltage appears across each of the ignitrons 32, 37 and 43 the phanotrons 50 controlling said ignitrons in turn become ionized, causing said ignitrons to fire. Once the contactors have been closed the ignitrons will fire successively and continuously until the contactors are opened. The manner of firing is controlled by the succession of positive half waves of voltage appearing across the tubes. Assuming that the first tube 32 has a positive half wave of voltage impressed upon it at the instant contactor A3 is closed, then said tube will fire automatically. Exactly 120 degrees after the voltage first becomes positive on tube 32 a positive voltage will appear on the second ignitron 37. This causes the second ignitron to fire and presently the first ignitron is extinguished. In the same manner ignitron 43 is fired 120 degrees after ignitron 37 fires. As long as the contactors A3, A4 and A5 remain closed the three ignitrons will continue to fire in rapid succession as just described.

This operation of the rectifier produces a voltage such that a uni-directional current impulse flows through the welding transformer primary 20, which in turn induces a uni-directional current in the welding transformer secondary 16. This induced current in the secondary circuit performs a welding operation on the workpieces 10.

Operation of the rectifier as above described may continue up to the point of saturation of the welding transformer and consequently operation of the same is limited to primary current impulses of short duration. To terminate the flow of current through the primary 20 the contactors A3, A4 and A5 are opened to prevent any further firing of ignitrons 32, 37 and 43. Immediately after these contactors have opened the second set of contactors, namely, B3, B4 and B5 are closed. One this has been accomplished the ignitrons 34, 38 and 44, controlled by phanotrons 52, fire automatically in rapid succession in exactly the same manner as explained in connection with the first set of ignitrons, the only difference being that the negative half of each voltage wave is utilized for firing this second set of ignitrons. Such operation takes place since the second set of ignitrons, namely, 34, 38 and 44, are connected in anti-parallel relation as regards the first set. Therefore each impulse of primary current caused by firing of the second set of ignitrons is in a direction opposite to that produced by firing the first set of ignitrons and thus each impulse of current flowing through the primary winding 20 of the welding transformer is in a reverse direction.

If contactors A3, A4 and A5 are caused to open and close in rapid succession alternately with contactors B3, B4 and B5, and wherein an arrangement is provided so that the two sets of contactors can never both be closed at the same time, then a series of uni-directional current impulses are passed through the primary 20 of the welding transformer, and which are alternately first in one direction and then in a reverse direction. This operation will induce a form of alternating current in the welding transformer secondary and which, in accordance with the invention, is a low frequency current, having a frequency of from 30 to less than 1 cycle per second, although it will be understood that a balanced load has been drawn from the three-phase power supply of conventional 60 cycle frequency.

Figure 2:
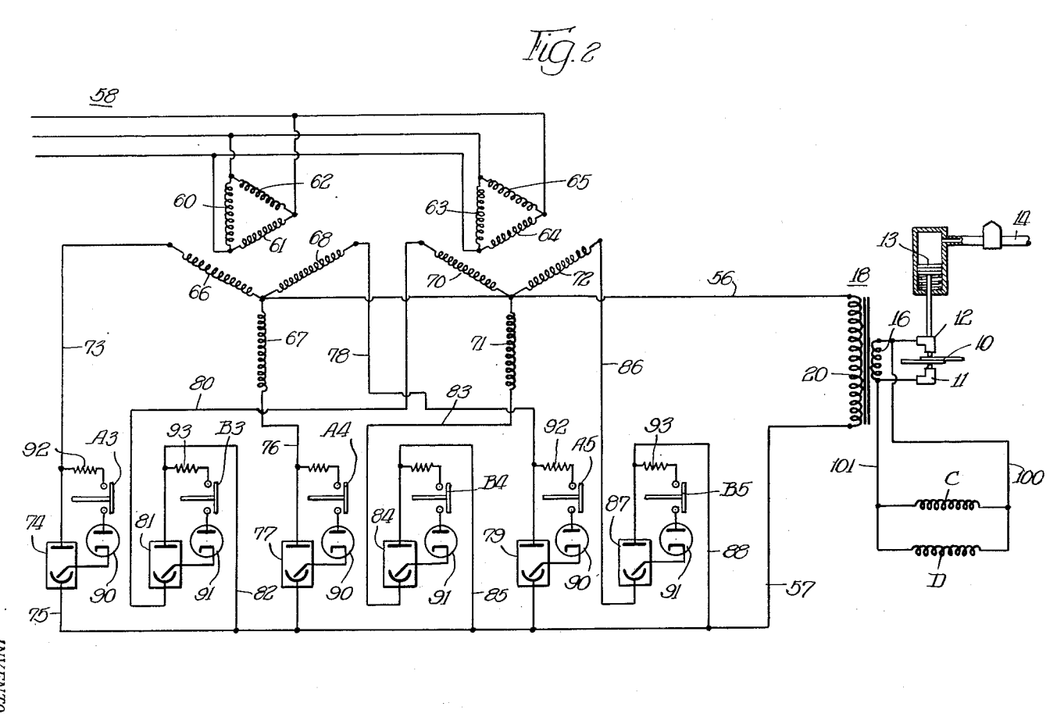
Figure 2 is a diagrammatic view illustrating a modified form of apparatus for welding coming within the invention.

The apparatus of Figure 2 operates in substantially the same manner as the apparatus of Figure 1, producing a low frequency current in the secondary circuit for welding purposes. However, the structure of the transformer-type rectifier has been modified and this modified structure will now be described.

The workpieces 10 are clamped under mechanical pressure by the electrodes 11 and 12, the pressure being applied by piston 13 receiving air under pressure from the air line 14. The electrodes are electrically connected to the secondary winding 16 of the welding transformer 18, having a primary winding 20. Conductors 56 and 57 electrically connect the primary winding 20 to the transformer-type rectifier which in this modification includes two transformers, each having primary windings and secondary windings. The source of current is identified by numeral 58, the same comprising the conventional three-phase alternating current supply which has a parallel connection with two sets of primary windings. One set includes the windings 60, 61 and 62. The other set comprises the windings 63, 64 and 65. The first set of secondary windings is identified by numerals 66, 67 and 68, with the second set of secondary windings being identified by numerals 70, 71 and 72. It will be observed that conductor 56 has connection with the neutral point of both sets of secondary windings. Conductor 57 also has electrical connection with the secondary windings by means of a plurality of ignitrons interposed in the circuit for rectifying the alternating current and for controlling the direction of current flow through said primary winding 20.

The secondary winding 66 is electrically connected by conductor 73 to the anode of ignitron tube 74. The cathode of said tube is joined by conductor 75 to the conductor 57. Secondary winding 67 is connected in a similar manner by conductor 76 to the anode of ignitron tube 77, the cathode of which connects with conductors 57. Also secondary windings 68, through conductor 78, is connected to the anode of ignitron tube 79, the cathode of which connects with conductor 57. Referring to secondary winding 70, it will be observed that conductor 80 electrically connects the terminal of this winding to the cathode of ignitron tube 81. The anode of said tube is joined by conductor 82 to 57. Winding 73 is similarly connected by means of conductor 83 to the cathode of ignitron 84 which has its anode electrically connected by conductor 85 to conductor 57. Winding 72 is connected by conductor 86 to the cathode of ignitron 87 and its anode is joined by conductor 88 to 57. It will be seen that each set of secondary windings has connection with a set of ignitron tubes and whereas the windings of the first set all connect with the anode of their ignitron tube, the windings of the second set all connect with the cathode of their ignitron.

As described in connection with Figure 1, each ignitron includes a firing pin and the circuit through the tube remains non-conducting until the mercury is vaporized, which is accomplished by the firing pin having contact with the mercury cathode. A control circuit is provided for each ignitron, having electrical connection with its respective firing pin and each circuit includes a phanotron and a contactor in series relation. For ignitrons 74, 77 and 79 phanotrons 90 are provided, whereas, for ignitrons 81, 84 and 87 phanotrons 91 are provided. The contactors for the first set of ignitrons are identified as A3, A4 and A5. The contactors for the second set are identified as B3, B4 and B5. Fuses, not shown, may be located in each by-pass circuit as protection against over-load for the phanotrons 90 and 91, respectively, and resistors 92 and 93 are likewise provided to limit the current through the phanotrons.

Firing of ignitrons 74, 77 and 79 is accomplished by closing contactors A3, A4 and A5. Once the contactors have been closed the ignitrons fire successively and continuously until they are opened, with the result that an impulse of current will be caused to flow in an upward direction through primary winding 20, returning by means of conductor 56 to the neutral point of the first set of secondary windings, namely, 66, 67 and 68. While this operation continues the second set of secondary windings remains inoperative since the ignitrons 81, 84 and 87 connecting therewith are non-conducting. When the first set of ignitrons is rendered non-conducting by opening contactors A3, A4 and A5 the mode of operation of the present apparatus contemplates that contactors B3, B4 and B5 will thereafter close, firing the ignitrons 81, 84 and 87. The first set of secondary windings thus becomes inoperative and the second set, including windings 70, 71 and 72, is rendered operative. However, since the ignitrons corresponding thereto are connected reversely from that of the first set of ignitrons the negative half cycles of alternating current are passed by the same so that a current impulse is thus caused to flow in a downward direction through primary winding 20, through the ignitrons, and back to the secondary windings. If contactors A3, A4 and A5 are caused to open and close in rapid succession and alternately with contactors B3, B4 and B5 as described in connection with Figure 1, and assuming means are provided so that the two sets of contactors can never be closed at the same time, then a series of uni-directional current impulses are passed through the primary 20 of the welding transformer and which are first in one direction and then in a reverse direction.

Figure 3:
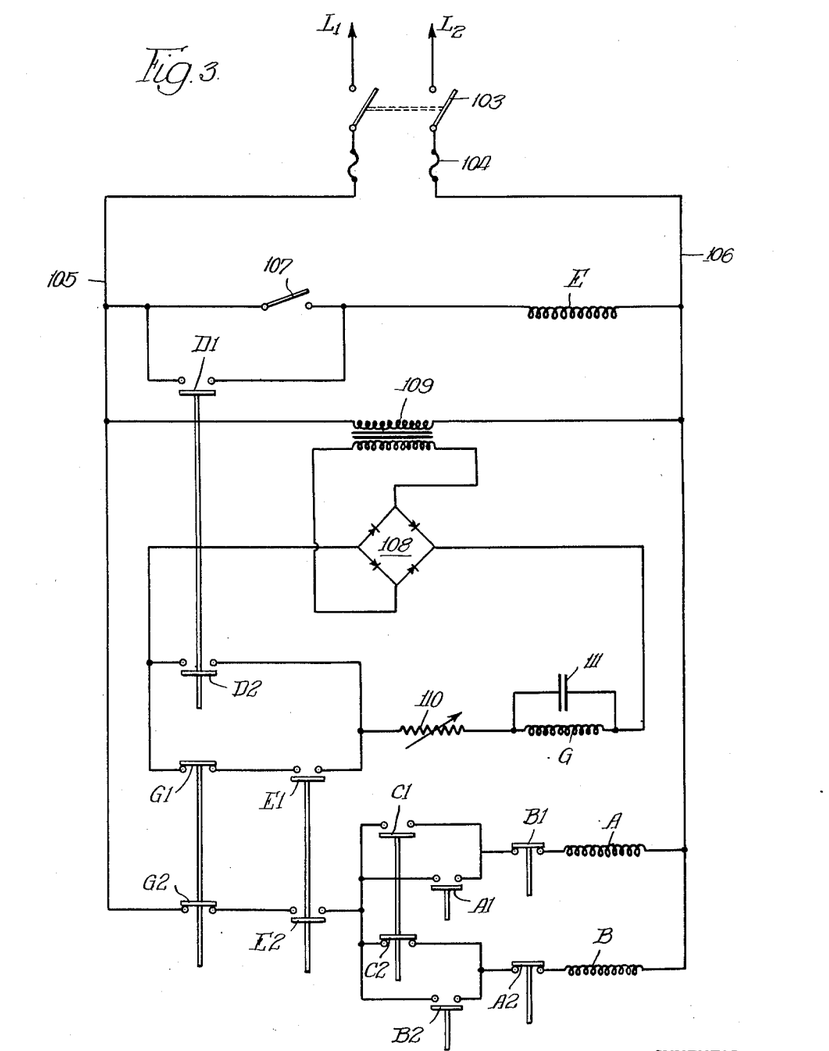
Figure 3 is a wiring diagram illustrating the electric controls for controlling the valves in the rectifier whereby each primary current impulse is reversed in direction.

Figure 3 discloses a control circuit for controlling operation of the respective sets of contactors for both welding systems as shown in Figures 1 and 2. The control circuit of Figure 3 is tied in with relays C and D, electrically connected in parallel relation with each other and with the secondary winding 16 by means of conductors 100 and 101. For the control circuit an alternating current supply is obtained from leads L1 and L2, the circuit including the switch 103, fuses 104 and conductors 105 and 106. When the initiating switch 107 is closed the relay E becomes energized, causing the normally open contactors E1 and E2 to close. A direct current voltage supply is obtained from rectifier 108, the primary of which is connected to the secondary of a constant voltage transformer 109, having electrical connection across the leads 105 and 106. By closing contactor E1 a constant direct current voltage is impressed upon relay G, the current flowing through the normally closed contactor G1 and the variable resistor 110. Relay G is not fully energized immediately because the rise in the current is delayed by the adjustable circuit including the variable resistor 110 and condenser 111. Meanwhile the closing of contactor E2 has caused relay B to become energized through the same and normally closed contactors G2, C2 and A2, with the result that the contactors, namely B3, B4 and B5, actuated by this relay, are caused to close.

Relay C is a direct current polarized relay which becomes energized and closes in the opposite direction for each impulse of current through welding transformer secondary 16. Therefore, this relay is energized and is caused to actuate as soon as current flows through the welding transformer primary caused by closing of contactors B3, B4 and B5. Energization of relay C will actuate contactors C1 and C2, causing the first to close and the second to open. Relay B, however, is not disturbed since the circuit for the relay remains closed as a result of actuation of its own contactor B2 into a closing position. Relay D in parallel with polarized relay C is a holding relay. It becomes energized as soon as voltage appears across the secondary 16 of the welding transformer, causing contactors D1 and D2 to close and the same remain closed as long as there is any voltage present.

After the current in the welding primary has flowed for a period of time, determined by the characteristics of the variable resistor 110 and condenser 111, the relay G becomes fully energized, effecting actuation of the normally closed contactors G1 and G2 into an open position. Opening of contactor G2 breaks the circuit to relay B, causing it to become immediately de-energized. The contactors B3, B4 and B5, controlling their respective ignitrons, accordingly open so that the ignitrons become non-conducting. Contactors B1 and B2 are likewise actuated by de-energization of relay B, the former closing and the latter opening. Closing of contactor B1 prepares the circuit so that relay A may become energized for transmitting the next primary impulse through primary 20 since energization of relay A will effect a closing of contactors A3, A4 and A5. When all the voltage has disappeared from the welding transformer secondary 16 relay D becomes de-energized, opening contactors D1 and D2. This in turn de-energizes relay G, reclosing the contactors G1 and G2. The control circuit including resistor 110, condenser 111, is again energized while the closing of contactors G1 and G2 effects energization of relay A through contactors G2, E2, C1, and B1. The relay B does not become energized at this time because contactor C2 is open with C1 being closed. With the energization of relay A contactors A3, A4 and A5 are caused to close, firing their respective ignitrons and producing a primary impulse which flows through winding 20 in a direction opposite to the preceding impulse. Polarized relay C is again actuated, closing contactors C2 and opening contactor C1. Also relay D is again actuated, closing relay contactors D1 and D2. After a predetermined time interval, controlled by the resistor and condenser, relay G becomes fully energized to effect opening of contactors G1 and G2. This causes relay A to become de-energized, terminating the current impulses to the welding transformer by interrupting the firing of the ignitrons controlled thereby. After the holding relay D has dropped out, opening contactors D1 and D2 and causing relay G to become de-energized, the sequence is in exactly the same position as it was originally after the initiating switch 107 was closed.

As long as switch 107 remains closed the above sequence of events continues to be repeated in rapid succession, producing the desired alternating current in the secondary 16 of the welding transformer. When switch 107 is open relay E becomes de-energized just as soon as contactor D1 is opened, thereby causing contactors E1 and E2 to open. This causes the control circuit to become inoperative, stopping all further current impulses. The purpose of the contactor D1 is to permit completion of the last impulse after switch 107 is open. Without this it would be possible to open switch 107 during an impulse, immediately opening contactors A3, A4 and A5 or B3, B4 and B5, so that the last welding impulse would be shorter than the others in duration.

Figure 4:
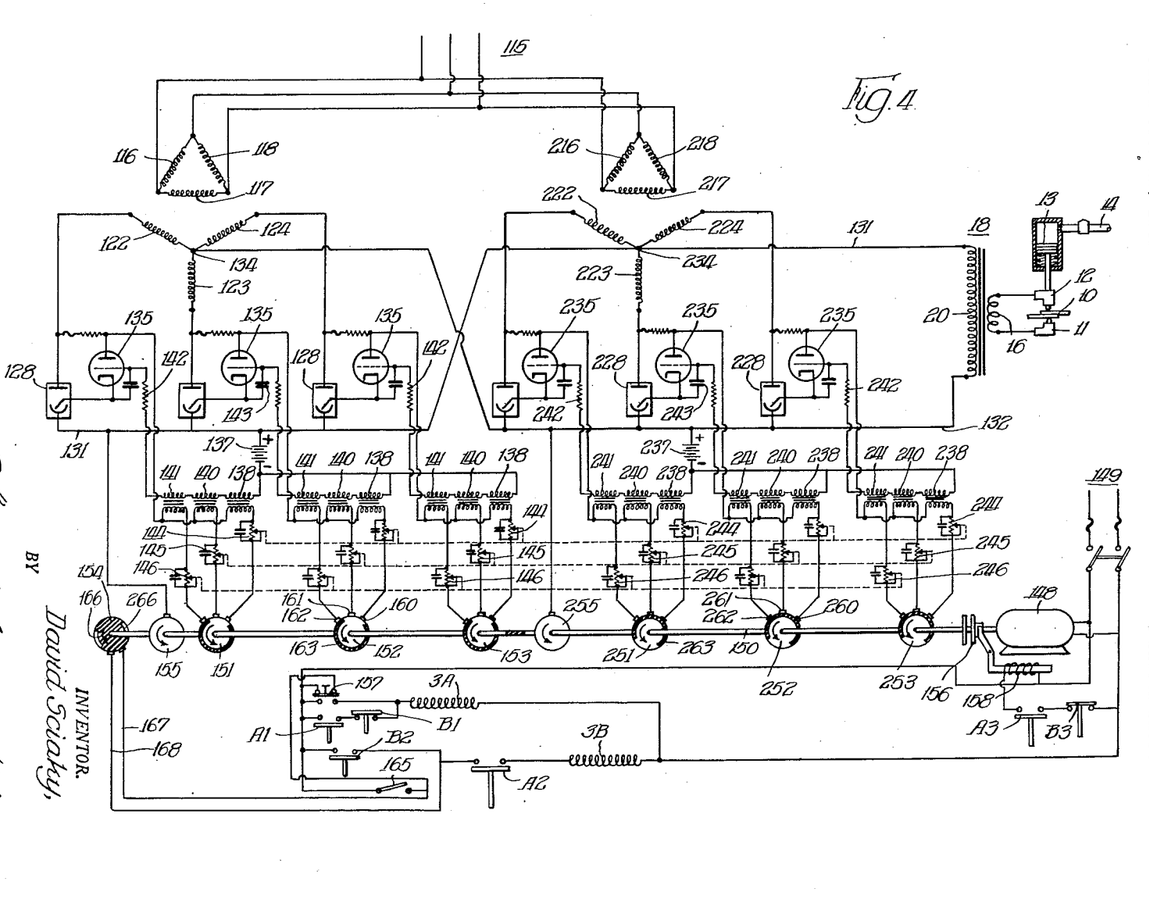
Figure 4 is a diagrammatic view illustrating another modification of apparatus coming within the invention.

In Figure 4 the welding apparatus diagrammatically disclosed includes a form of phase shifting control for the ignitrons of the transformer-type rectifier whereby a preheating current, welding current and a postheating current may be produced for each welding operation. As described in connection with Figure 2, the rectifier includes two transformers, each having primary windings and secondary windings. The source of alternating current is identified by numeral 115, the same comprising the conventional three-phase supply and which has a parallel connection with two sets of primary windings, the respective windings being identified as 116, 117 and 118 and 216, 217 and 218.

Secondary windings are associated with the primary windings, with the respective windings of the same being identified by numerals 122, 123 and 124 and 222, 223 and 224. An ignitron tube 128 has connection with each winding of the first set of secondary windings, and in a similar manner ignitrons 228 have connection with the secondary windings of the second set. The primary winding 20 of the welding transformer 18 has electrical connection to conductors 131 and 132. The former has connection at 234 with the neutral point of the second set of secondary windings and then continues so as to connect with the cathode of the ignitrons 128. Conductor 132 has connection with the cathodes of the ignitrons 228 and continues to electrically connect with the neutral point 134 of the first set of secondary windings.

Numeral 135 indicates the thyratrons controlling ignitrons 128 and numeral 235 indicates the thyratrons controlling ignitrons 228. In operation the two rectifiers are fired alternately. The grids of tubes 135 are made positive while the grids of tubes 235 are held negative. This causes ignitrons 128 to become conductive, causing a flow of current through the ignitrons 128, conductor 131, downwardly through the primary winding 20, through conductor 132, and back to the neutral point 134 of the secondary windings 122, 123 and 124. Then the grids of tubes 135 are held negative while the grids of tubes 235 are rendered positive. This causes ignitrons 228 to become conductive while tubes 128 are rendered non-conductive. In this condition current flows through the ignitrons 228, conductor 132, upwardly through the primary winding 20 to conductor 131, and then to the neutral point 234 of the secondary windings 222, 223 and 224. Accordingly, as the various sets of ignitrons are alternately rendered conductive and non-conductive uni-directional impulses will be caused to flow through primary winding 20 and which alternate first in one direction and then in the opposite direction. This in turn induces an alternating current in the secondary 16 of the welding transformer which has a relatively low frequency.

In the non-firing conditions thyratrons 135 are held non-conductive by the negative grid bias 137. The circuit is as follows: Starting from the cathodes of thyratrons 135, through the firing pins of the ignitrons 128, the mercury cathodes of said tubes, to conductor 131, to the positive side of battery 137. The negative side of the battery is connected to the grids of the thyratrons 135, through the series-connected secondaries of transformers 138, 140 and 141 and the current limiting resistors 142. The transformers 138, 140 and 141 have no effect in this condition as their primaries are not connected to any source of voltage as will be presently understood. Condensers 143 between the grid and cathode of thyratrons 135 are present merely to by-pass any transients which may occur.

The thyratrons 235 are likewise connected to a negative grid bias 237 with the positive side of the battery being joined to the cathodes of ignitrons 228 and the negative side being connected to the grids of the thyratrons 235 through the series-connected secondaries of transformers 238, 240 and 241 and the current limiting resistors 242. Both bias supplies 137 and 237 are made just sufficiently negative to prevent firing of the thyratrons 135 and 235 during positive half cycles of the plate voltage with a suitable margin of safety. Firing of ignitrons 128 and 228 is accomplished by causing the grids of thyratrons 135 and 235 to become positive at a predetermined time during the positive half cycle appearing across the tubes.

Transformers 138, 140 and 141 and 238, 240 and 241 are peaking transformers, that is, the secondary voltage appears as a series of peaks alternating positive and negative of the same frequency as the alternating current applied to the primary. In this case the applied primary voltage is the sine wave alternating current appearing across the thyratrons 135 and 235. There are three sets of peaking transformers in each rectifier, the primaries of each set in the first rectifier being connected across the corresponding tubes 135, cathode to plate circuit, and the primaries of each set in the second rectifier being connected across the corresponding tubes 235, cathode to plate circuit.

The alternating current voltage appearing in the primaries of the transformers 138, 140 and 141 and 238, 240 and 241 may be shifted in phase with respect to the cathode plate voltage of tubes 135 and 235 by means of the condenser-resistor arrangements 144, 145, 146 and 244, 245 and 246. The constants of these condenser-resistor circuits are such that by varying the resistors it is possible to shift the phase relationship while the magnitude of the applied voltage remains unchanged. Therefore it will be seen that as the adjustable resistors are varied the positive peaks produced by the secondaries of the peaking transformers are caused to occur at different times in the positive half cycles of voltage appearing across the thyratrons. The secondary peaks are of sufficient magnitude to more than overcome the negative bias 137 or 237. Thus, it will be seen that the tubes 135 and 235 can be caused to fire at any point by means of the positive peaks appearing on their grids.

The electric motor 148 is connected to an electric supply line 149 and said motor is of such nature that its speed is constant. A shaft 150, formed of any suitable metal so as to comprise an electrical conductor, has the contact members 151, 152 and 153 mounted thereon and similar contact members 251, 252 and 253 likewise mounted thereon, in addition to the cam 154 and contact member 155. Said shaft 150 is mechanically connected to motor 148 through clutch 156. Closing of the foot switch 157 energizes coil 158 and through sequencing mechanism to be described the linkage is actuated to operate clutch 156, thereby effecting rotation of shaft 150 at the same speed as motor 148. Operation of the apparatus is such that whenever clutch 156 is disengaged the contact members 151, 152 and 153 and 251, 252 and 253 will be so positioned that their respective contact brushes will be in engagement with the insulated sections 163 and 263 of said members.

When clutch 156 is engaged the shaft 150 is rotated in the direction indicated and it may be assumed that brushes 160 are first caused to come in contact with the conductor section of contact members 151, 152 and 153. At this point the electrical connection is complete between the primaries of the transformers 138 and the tubes 135. Accordingly, the tubes 135 and consequently the ignitrons 128 will fire at the point where the positive secondary peak occurs in each positive half wave appearing across tubes 135. As shaft 150 continues its rotation contact brushes 161 and then brushes 162 will come in contact with the conductor section of members 151, 152 and 153. This in turn will produce secondary positive peaks in transformers 140 and 141, causing the same to appear on the grids of tubes 135 during each positive half cycle of plate voltage. As shaft 150 continues its rotation brushes 160 will eventually come in contact with the insulated section 163 of the contact members and following this action brushes 161 will contact said insulated section and finally brushes 162. The secondary peaks in the transformers 138, 140 and 141 will thus disappear and tubes 135 are again maintained non-conductive by the negative grid bias 137.

Contact members 251, 252 and 253 are mounted on shaft 150 in angular displaced relation, approximately 180 degrees from contact members 151, 152 and 153. Therefore following approximately a half revolution of shaft 150 contact brushes 260 will come in contact with the conductor section of their respective contact members, producing a secondary positive peak in transformers 238. Eventually brushes 261 and then 262 will engage the conductor section of these contact members and secondly, positive peaks will be produced in transformers 240 and 241. The same will appear on the grids of tubes 235 during each positive half cycle of plate voltage and ignitrons 228 will be rendered conductive. As rotation of shaft 150 continues the contact brushes will again engage the insulated sections 263 of their contact members, whereupon the secondary peaks in the transformers will disappear and tubes 235 will be again rendered non-conductive by the negative grid bias 237.

As regards the control apparatus above described, one typical mode of operation of the contact members for producing peak voltages in the secondaries of the peaking transformers would be to have the peak in transformer 138 and 238 occur late in the positive half cycles of plate voltage on the thyratrons so that the voltage appearing across the primary winding 20 is low, producing a low secondary or preheating current which rises slowly for preheating the weld.. The peak voltages produced in the secondaries of transformers 140 and 240 would appear early in the positive half cycles to provide a high voltage input to the welding transformer primary and a corresponding high secondary current to thereby form the welding current. Finally, the peak voltages produced by transformers 141 and 241 would be caused to appear late in the positive half cycles of voltage on the plates of the thyratrons, causing a lower voltage across the welding transformer primary which in turn causes the secondary current to fall off from the welding peak to some lower value, thus constituting a post-heating current. Since the condenser-resistor arrangements 144, 145 and 146 are mechanically linked with the condenser-resistor arrangements 244, 245 and 246, the above conditions can be correlated as regards the two transformer type rectifiers.

By adjusting the speed of rotation of shaft 150, the length of the conductor sections on the contact members, and the spacing between the contact brushes almost any combination of duration and magnitude of preheat, weld and post-heat currents appearing in the secondary 16 of the transformer may be obtained. Operation may be arranged such that any time switch 157 is closed only one primary current impulse is obtained. It is also possible with the form of control herein shown to effect continuous rotation of shaft 150 at a constant speed as long as the switch 157 remains closed to induce an alternating current in the load circuit 16. For a single operation the switch 165 is permanently closed. When switch 157 is moved to down position the relay coil 3A becomes energized since the same is connected across the supply source 149. The normally open contactor A1 of relay 3A closes to lock the relay in energized position. Contactors A2 and A3 also close, the latter energizing the solenoid coil 158. This in turn moves the actuating mechanism to close clutch 156 and shaft 150 thereupon rotates in the direction as indicated at constant speed to cause firing of the ignitrons of one of the two rectifiers.

At the proper times in the rotation of shaft 150 the conductor sections 166 and 266 in the cam 154 will complete the circuit between the conductors 167 and 168. When the circuit is completed, as for example by 166, relay 3B becomes energized since contactor A2 has been actuated to a closed position. The normally closed contactor B3 opens to deenergize coil 158, releasing mechanism 156 to disengage the clutch. By this time the contact brushes 160, 161 and 162 will be in engagement with the insulated section of their respective contact members. Also conductor section 166 will have rotated slightly past the contact brushes of conductors 167 and 168 by the time shaft 150 comes to rest. Relay 3B, however, is held energized through contactor B2 which closed when relay 3B was energized. If initiating switch 157 is held in the down position during the above operation the sequence is locked in the last mentioned position until said switch is released. As soon as this action takes place relay 3A becomes deenergized since contactor B1 remains open as long as relay 3B remains energized. Accordingly, contactor A2 is opened, thereby effecting deenergization of relay 3B and contactor A3 likewise opens with contactor B3 closing. The reclosing of switch 157 will cause the entire operation to be repeated for another impulse of welding current except that the other rectifier will supply the impulse and the sequence is controlled by the conductor section 266 which is placed 180 degrees from conductor section 166.

For repeat operation the switch 165 is left open. Closing of switch 157 in the down position will energize relay 3A which closes contactor A1, A2 and A3. The former locks the relay in energized position and contactor A3 causes solenoid 153 to become energized, moving the clutch 156 to operative position, starting rotation of shaft 150. An impulse of current is caused to flow through primary winding 20, producing a welding impulse in the same manner as described above in connection with the first rectifier. This time, however, when conductors 167 and 168 are closed by the conductor section 266 of cam 154, the relay 3B will not become energized as long as switch 157 is held in down position because the circuit is not complete, switch 165 being opend. Therefore the shaft 150 will continue to rotate at constant speed, causing a repetition of current impulses to the welding transformer and which alternate in direction. To stop the operation switch 157 is released or moved to the up position. As soon as one of the conductor sections 166 or 266 closes the circuit between conductors 167 and 168 the relay 3B will become energized since the circuit is now completed by the upper positioning of switch 157. By energizing said relay 3B contactor B3 is caused to open, deenergizing the solenoid coil 158 and causing the clutch to be released. Rotation of shaft 150 is accordingly terminated as described in connection with the single impulse operation. When the shaft ceases to rotate under both methods of operation the contact brushes 160, 161 and 162 will be in contact with the insulated section of their respective members and likewise the contact brushes 260, 261 and 262 will also be in contact with the insulated sections of their respective members.

The alternating current transformers disclosed in the drawings are representative only of one embodiment wherein the rectifier means and the transformer have been combined as a unit. In many installations of the present invention the alternating current transformer will be located some distance from the rectifier means and therefore would not constitute a unit assembly therewith. In fact, several rectifier means of the type herein disclosed and claimed may be electrically connected with a single transformer comprising the alternating current source for all said rectifier means.

What is claimed is:

1. For use in supplying uni-directional current impulses to a transformer from a source of polyphase alternating current, the combination comprising electric discharge valves connected in circuit with the source and said transformer, said valves being so arranged as to form two groups with each group having a valve for each phase of the alternating current source, one group being electrically connected to the transformer to pass the positive half cycles of said alternating current source as a uni-directional current in one direction, and the other group being electrically connected to the transformer to alternately pass the negative half cycles of the alternating current source as a uni-directional current in the opposite direction.

2. For use in supplying uni-directional current impulses to a transformer from a source of polyphase alternating current, the combination comprising two electric discharge valves connected between each phase of the source and said transformer, each valve including an anode, a cathode and a control electrode for firing the valves to render them conducting, said valves therefore comprising two groups with the valves for each phase being connected in anti-parallel and having the cathode of one joined to the anode of the other, and means for alternately rendering each group of valves conducting, whereby one group has operation to pass successive positive half cycles of the alternating current source as a uni-directional current in one direction, and whereby the other group has operation to alternately pass successive negative half cycles of said alternating current source as a uni-direction current in the opposite direction.

3. For use in supplying uni-directional current impulses to a welding transformer from a source of polyphase alternating current to secure a single-phase welding current of low frequency, the combination comprising electric discharge valves connected in circuit with the source and said transformer, said valves each including an anode, a cathode and a control electrode for firing the valves to render them conducting, said valves comprising two groups with each group having a valve for each phase of the alternating current source, the valves for each phase being connected in anti-parallel relation with the cathode of one being joined to the anode of the other, and a control circuit responsive to current flow in the transformer for alternately rendering each group of valves conducting, whereby one group has operation to pass successive positive half cycles of said alternating current source as a uni-directional current in one direction, and whereby the other group has operation to alternately pass successive negative half cycles of the alternating current source as a uni-directional current in the opposite direction.

4. Apparatus for the resistance welding of metals, a source of alternating current, a welding transformer having a primary winding and a secondary load circuit, a primary circuit electrically connecting with said primary winding, at least one pair of electric discharge valves connected in anti-parallel relation in said primary circuit for electrically connecting the alternating current source with said primary winding, control means for alternately firing said discharge valves whereby one discharge valve has operation to pass a predetermined number of positive half cycles of the alternating current source to the primary winding depending on the length of the conducting period of said valve and whereby the other discharge valve has operation to alternately pass a predetermined number of negative half cycles of the alternating current source to the primary winding depending on the length of the conducting period of said valve, and current actuated means responsive to the current flowing in the welding transformer for controlling said control means.

5. In apparatus of the character described, the combination with a source of polyphase alternating current, of a rectifier electrically connected to said alternating current source on its input side, a reactive load circuit electrically connected to the output side of said rectifier, said rectifier including two groups of electric discharge valves with each group comprising a valve for each phase of the alternating current source, and said valves having an electrical connection in the reactive load circuit and the values for each phase being connected in anti-parallel relation whereby one group passes the positive half cycles of the alternating current source to the reactive load circuit as a uni-directional current in one direction, and whereby the other group alternately passes the negative half cycles of the alternating current source to the reactive load circuit as a uni-directional current in the opposite direction.

6. In apparatus of the character described, the combination with a source of polyphase alternating current, of a rectifier electrically connected to said alternating current source on its input side, a reactive load circuit electrically connected to the output side of said rectifier, said rectifier including two groups of electric discharge valves with each group comprising a valve for each phase of the alternating current source, said valves each including an anode, a cathode and a control electrode, the cathodes of one group being electrically connected to the anodes of the other group, and a control circuit for rendering the valves conducting in an alternate manner as regards said groups whereby one group passes successive positive half cycles of the alternating current source to the reactive load circuit as a uni-directional current in one direction, and whereby the other group alternately passes successive negative half cycles of the alternating current source to the reactive load circuit as a uni-directional current in the opposite direction.

7. In apparatus of the character described, the combination with a source of polyphase alternating current, a welding transformer having a primary winding and a secondary load circuit, a primary circuit electrically connecting with said primary winding, a transformer-type rectifier for connecting said primary circuit to said source of polyphase alternating current, said transformer-type rectifier including secondary windings with one terminal of the primary circuit being connected to a neutral point on the secondary windings and electric discharge valves connecting the secondary windings with the other terminal of the primary circuit, said electric discharge valves comprising two groups with each group having a valve for each phase of the polyphase source, and said valves for each phase being connected in anti-parallel relation and having operation whereby one group passes successive positive half cycles of the alternating current source to the primary circuit as a uni-directional current in one direction, and whereby the other group passes successive negative half cycles of the alternating current source to the primary circuit as a uni-directional current in an opposite direction.

8. Apparatus as defined by claim 7 additionally including control means for rendering said valves conducting in an alternate manner as regards said groups, and current actuated means responsive to the current in the secondary load circuit for regulating said control means.

9. In apparatus of the character described, the combination with a source of polyphase alternating current, a welding transformer having a primary winding and a secondary load circuit, a primary circuit electrically connecting with said primary winding, two rectifiers of the transformer type for connecting said primary circuit to said source of polyphase alternating current, each transformer-type rectifier including a secondary winding for each phase of the alternating current source and an electric discharge valve in series relation with each winding, each valve comprising an anode, a cathode and a control electrode for rendering the valves conducting, and said rectifiers being connected in anti-parallel in said primary circuit, whereby one rectifier when conductive will pass the positive half cycles of the alternating current source to the primary circuit as a uni-directional current in one direction, and whereby the other rectifier when conductive will pass the negative half cycles of the alternating current source to the primary circuit as a uni-directional current in an opposite direction.

10. Apparatus as defined by claim 7 additionally including means in the form of a biasing potential for maintaining the electric valves non-conducting, control means for each valve including peaking transformers capable of producing secondary peak voltages sufficient to overcome the biasing potential to render the electric valves conducting, and means having associated relation with the primary circuits of the peaking transformers for conditioning said primary circuits to render the valves conducting in an alternate manner as regards said groups and to also control the duration of the period during which each group is conductive.

11. In apparatus of the character described, the combination with a source of polyphase alternating current, a welding transformer having a primary winding and a secondary load circuit, a primary circuit electrically connecting with said primary winding, two rectifiers of the transformer-type for connecting said primary circuit to said source of polyphase alternating current, each transformer-type rectifier including a secondary winding for each phase of the alternating current source and an electric discharge valve in series relation with each winding, one terminal of the primary circuit being connected to a neutral point on the secondary windings of each rectifier and the other terminal having connection with the valves, and said valves for each phase being connected in anti-parallel relation and having operation whereby one rectifier passes successive positive half cycles of the alternating current source to the primary circuit as a uni-directional current in one direction, and whereby the other rectifier alternately passes successive negative half cycles of the alternating current source to the primary circuit as a uni-directional current in an opposite direction.

DAVID SCIAKY.

REFERENCES CITED

The following references are of record in the file of this patent:

UNITED STATES PATENTS

| Number | Name | Date |
|---|---|---|
| 2,105,194 | Locke | Jan. 11, 1938 |
| 2,173,121 | Locke | Sept. 19, 1939 |